June 13, 1939.  A. F. ROBERTSON  2,161,956
ADJUSTABLE COUPLING
Filed Oct. 14, 1937
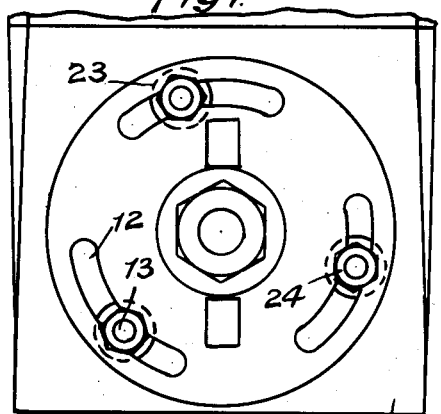
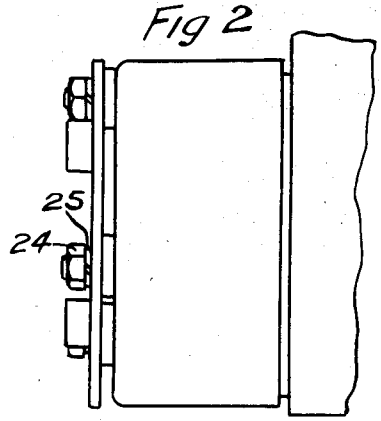
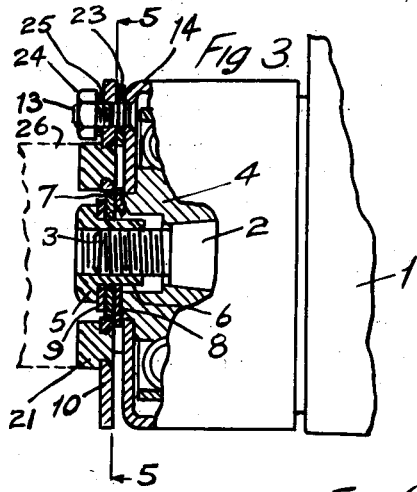
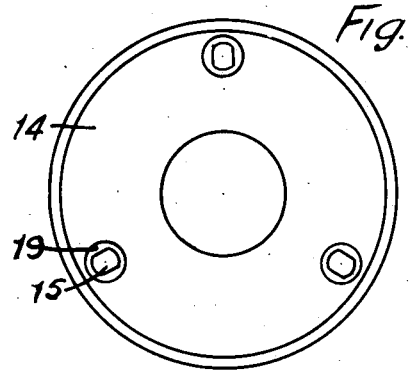
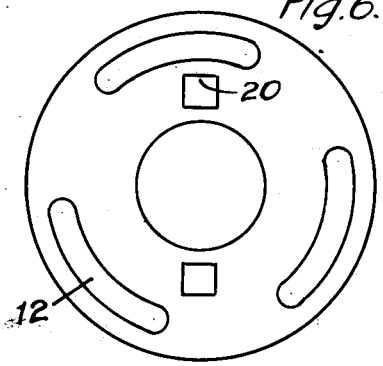
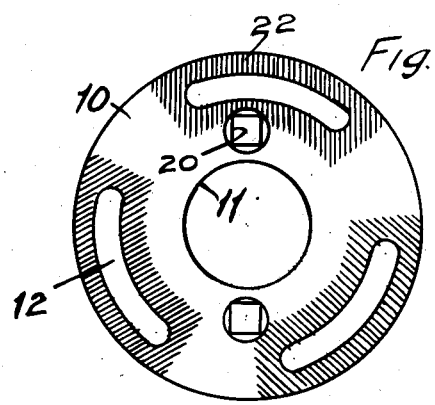
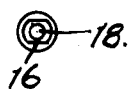
INVENTOR.
Arthur. F. Robertson.
BY A. D. T. Libby
ATTORNEY.

Patented June 13, 1939

2,161,956

UNITED STATES PATENT OFFICE 2,161,956

ADJUSTABLE COUPLING

Arthur F. Robertson, Belleville, N. J., assignor to Edison-Splitdorf Corporation, West Orange, N. J., a corporation of New Jersey Application October 14, 1937, Serial No. 168,866

8 Claims. (Cl. 287—129)

This invention relates to an adjustable coupling suitable for connecting an electro-magnetic machine to a driving shaft or member carried thereby. The coupling to be hereinafter described is especially advantageous for connecting a magneto to a driving member on an internal combustion engine.

In mounting magnetos on such engines, it is customary to connect the magneto to the driving member on the engine through an adjustable coupling, so that the angular relation of the magneto shaft with respect to the engine driving member may be adjusted to get the desired timing between the two members. In many cases this adjustable coupling is a separate device interposed between the magneto and the engine-operating member. For use on certain types of engines, the magnetos are fitted with impulse starter couplings which, when used, add considerable to the overall length of the magneto. Thereby more longitudinal space is required to mount the magneto with an impulse coupling than is required to mount such a magneto without such starter coupling. It frequently happens that the space available on the engine for mounting a magneto with an impulse coupling is not sufficient to get the apparatus in the space provided; or, stated in another way, the space required for such an installation is greater than can be readily taken care of in the layout of the engine. Furthermore, there are at the present time a large number of engines fitted with magnetos having no impulse couplings and which do not have the space to install a magneto with such a device, although the same may be desired.

My invention is directed more particularly to a combination impulse coupling and adjustable timing device whereby the combined structure occupies a minimum of longitudinal space so that a magneto equipped with an adjustable impulse coupling can be installed in many places where the present types of impulse starters and adjustable couplings cannot be used.

It is therefore the principal object of my invention to provide an adjustable coupling which may be combined with an impulse starter in such a way as to conserve longitudinal space.

Another object of my invention is to provide and adjustable coupling combination which is centralized so as to run true with the axis of the magneto shaft.

Another object of my invention is to provide an adjustable coupling which is simple and cheap to manufacture, yet efficient in its operation.

These and other objects will be clear to one skilled in this art after a study of the specification taken in connection with the annexed drawing, wherein:

Figure 1 is a partial end view of a magneto showing a combined impulse starter and adjustable coupling.

Figure 2 is a side view of Figure 1, looking from right to left.

Figure 3 is a view similar to Figure 2, but with certain of the parts broken away to show the interior construction.

Figure 4 is an end view of the casing comprising part of the driving member of the impulse coupling.

Figure 5 is a view of the adjustable coupling disc, looking in the direction of the line 5—5 of Figure 3.

Figure 6 is a back view of Figure 5.

Figure 7 is a view of the driving stud used in connection with the coupling.

Figure 8 is an end view of Figure 7 looking from right to left.

In the various views, wherein like numbers refer to corresponding parts, 1 is the frame of a magneto having a rotatable shaft 2 and a threaded end 3. The end of the shaft adjacent the threaded end 3 is tapered to receive a driven member 4 of an impulse coupling which is held on the tapered end of the shaft 2 by a key and nut 5 having a sleeve 6 which carries a closely fitting washer 7. Interposed between the washer 7 and the member 4 is a spacer 8, and on the other side of the washer 7 behind the head of the nut 5 is a lock washer 9, so that when the nut 5 is set up tightly on the threaded end 3 of the magneto shaft, the washer 7 is held securely in place along with the driven member 4. This construction provides a true running surface for the outer periphery of the washer 7, the advantages of which will be presently pointed out.

Positioned over and closely fitting the outer periphery of the washer 7 is a coupling plate or member 10, the hole 11 therein closely fitting over the outer periphery of the washer 7 as just explained. The member 10 is provided with a plurality of arcuately positioned slots 12 to receive screw studs 13 which are anchored to the driving member 14 forming part of the impulse starter. The holes 15 in the member 14 are formed as indicated in Figure 4, with two parallel sides so as to cooperate with the flat sides 16 on the ends 17 of the studs 13. The inner ends of these studs may be provided with recesses 18 to assist in spinning over the metal into the spaces 19 as indicated in Figures 3 and 4. If desired, these studs may be welded instead of being riveted in place.

The member 10 is provided with polygonally shaped holes 20, preferably square, to receive the squared ends of driving studs 21 which may be riveted or welded thereto in a manner similar to that explained with respect to the screw studs 13. Around or in close proximity to the slots 12, the member 10 is provided with a plurality of roughened or knurled surfaces 22 which are adapted to grip into washers 23 which snugly fit over the clamping studs 13 between the member 10 and the base of the driving member 14 of the impulse starter. The washers 23 are of hard fiber or preferably of metal such as aluminum, brass or copper, which will allow the roughened or knurled portions 22 to take a grip therein without undue compression, so that when the nuts 24 on the screw studs 13 are drawn up against the lock washers 25, the member 10 will be securely gripped or held to the driving member 14 of the impulse starter.

It will be understood that the studs 21 are adapted to cooperate with some part of a driving member indicated by the dotted line 26, which is mounted on an engine shaft.

From the construction described, it will be seen that before the coupling member 10 is fastened into position by the nuts 24, at the time when the magneto is being installed or timed with the engine, it is accurately located with respect to the axis of the magneto shaft for the reasons heretofore stated, and that when the nuts 24 are drawn up, this relation need not change, and the driving member of the impulse coupling, which is constructed so as to have a rotatable motion about the member 4 during the impulsing period, will be truly driven about this axial center, thereby reducing to a minimum the strains which are present in other types of construction, and consequently, a more satisfactory and durable device or combination of parts is produced.

While I have chosen to show this adjustable coupling in connection with an impulse starter, wherein many advantageous results are accomplished, some of which have been heretofore set forth, the principles of construction of the coupling may be applied to the coupling device as a unitary structure per se.

What I claim is:

1. An adjustable coupling for the general purpose described including in combination with a shaft to be driven; at least one member operatively carried by the shaft for driving it, a coupling member radially located around the shaft and having arcuately positioned timing slots therein with knurled surfaces adjacent said slots, and driving lugs fastened thereto, the member, operatively carried by the shaft, having clamping studs fastened thereto and extending through said slots in the timing member, washers capable of being gripped without undue compression by said knurled surfaces carried on said clamping studs between the coupling member and the member operatively carried by the shaft, and means on the clamping studs for securing said coupling member in its adjusted position with respect to said member operatively carried by said shaft.

2. An adjustable coupling as set forth in claim 1, further characterized in that positive means are carried by said shaft for radially centralizing said coupling member with respect to the shaft axis before the coupling member is fastened in running condition.

3. An adjustable coupling for the general purpose described including in combination with a shaft to be driven; at least one member operatively carried by the shaft for driving it, a coupling member radially located around the axis of rotation of the shaft and having arcuately positioned slots therein and also having driving means for cooperation with a source of power, clamping means operative through said slots between the said member operatively carried by the shaft and the said coupling member, washers capable of being gripped in compression between said shaft member and said coupling member through the agency of said clamping means, at least one of said members having a knurled surface disposed in biting engagement with said washers whereby said coupling member may be drivably secured to said shaft member in angularly adjusted relationship.

4. An adjustable coupling as set forth in claim 3, further characterized in that positive means are carried by said shaft for centralizing said coupling member about the axis of rotation of the shaft independent of the clamping means.

5. An adjustable coupling as set forth in claim 3, further characterized in that the said clamping means comprise a plurality of longitudinal screw threaded means disposed in fixed angular position in the member operatively carried by the shaft, and said washers are carried by said screw thread means in a snug-fitting relationship whereby the washers are non-slidable relative to the shaft member.

6. An adjustable coupling as set forth in claim 3, further characterized in that said knurled surface is on the coupling member and extensive over areas adjacent the said slots.

7. A combined impulse and adjustable coupling including, in combination, a driving member forming part of said impulse coupling and having clamping studs fastened thereto, means for holding the impulse coupling, including the said driving member, on a shaft to be impulsed, a centralizing device carried by said holding means so its outer periphery is concentric with the shaft axis, a coupling member fitting concentrically over said centralizing device, said coupling member having means for driving it from a suitable source of power and also having arcuately positioned timing slots to receive said clamping studs, and means carried by said studs for fastening said coupling member in adjusted position to said impulse driving member.

8. A combined impulse and adjustable coupling including, in combination, a driving member forming part of said impulse coupling, means for holding the impulse coupling, including the said driving member, on a shaft to be impulsed, an angularly adjustable plate having means for applying driving power thereto and also having arcuately positioned slots therein, a concentric journal for the plate concentrically mounted on the shaft, said driving member having means traversing said slots for fastening the plate and driving member in an adjusted position, compression locking means interposed between said plate and said impulse driving member and effectively engaged by the operation of said fastening means.

ARTHUR F. ROBERTSON.